United States Patent
Yanagi

(10) Patent No.: US 7,411,580 B2
(45) Date of Patent: Aug. 12, 2008

(54) INPUT DEVICE WITH ANTENNA

(75) Inventor: Masahiro Yanagi, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 252 days.

(21) Appl. No.: 10/016,118

(22) Filed: Dec. 17, 2001

(65) Prior Publication Data

US 2002/0171631 A1    Nov. 21, 2002

(30) Foreign Application Priority Data

May 21, 2001   (JP) .............................. 2001-151554

(51) Int. Cl.
   *G09G 5/08*   (2006.01)
(52) U.S. Cl. ...................... 345/163; 345/158
(58) Field of Classification Search ......... 345/156–179; 341/20–21; 455/575.5, 90.1, 90.2, 90.3, 455/575; 343/702; 348/734
   See application file for complete search history.

(56) References Cited

U.S. PATENT DOCUMENTS

| | | | |
|---|---|---|---|
| 5,561,437 A * | 10/1996 | Phillips et al. | 343/702 |
| 5,638,441 A * | 6/1997 | Hattori et al. | 379/433.13 |
| 5,708,458 A * | 1/1998 | Vrbanac | 345/156 |
| 5,809,433 A * | 9/1998 | Thompson et al. | 455/575.7 |
| 5,854,621 A * | 12/1998 | Junod et al. | 345/158 |
| 5,966,098 A * | 10/1999 | Qi et al. | 343/702 |
| 5,995,052 A * | 11/1999 | Sadler et al. | 343/702 |
| 6,201,534 B1 * | 3/2001 | Steele et al. | 345/157 |
| 6,227,872 B1 * | 5/2001 | Stephenson et al. | 439/76.1 |
| 6,246,374 B1 * | 6/2001 | Perrotta et al. | 343/702 |
| 6,256,481 B1 * | 7/2001 | Jeong et al. | 455/575.3 |
| 6,272,324 B1 * | 8/2001 | Rudisill et al. | 455/575.8 |
| 6,301,468 B1 * | 10/2001 | Slayton et al. | 455/575.3 |
| 6,356,243 B1 * | 3/2002 | Schneider et al. | 343/866 |
| 6,373,469 B1 * | 4/2002 | Chen | 345/163 |
| 6,430,400 B1 * | 8/2002 | MacDonald et al. | 455/90.1 |
| 6,434,370 B1 * | 8/2002 | Kodera et al. | 455/90.1 |
| 6,442,400 B1 * | 8/2002 | Ying et al. | 455/552.1 |
| 6,445,379 B1 * | 9/2002 | Liu et al. | 345/163 |
| 6,571,086 B1 * | 5/2003 | Uusimaki | 455/90.3 |
| 6,677,903 B2 * | 1/2004 | Wang | 343/702 |
| 6,801,967 B2 * | 10/2004 | Nakamura et al. | 710/62 |
| 6,909,906 B1 * | 6/2005 | Miyashita | 455/550.1 |
| 7,225,003 B2 * | 5/2007 | Shoji et al. | 455/575.5 |
| 2002/0077067 A1 * | 6/2002 | Lochner et al. | 455/73 |

FOREIGN PATENT DOCUMENTS

| | | | |
|---|---|---|---|
| JP | 5-324194 | | 12/1993 |
| JP | 7-5984 | | 1/1995 |
| JP | 08-76918 | * | 3/1996 |
| JP | 9-204269 | | 8/1997 |

* cited by examiner

*Primary Examiner*—Nitin Patel
(74) *Attorney, Agent, or Firm*—Staas & Halsey LLP

(57) ABSTRACT

In an input device in that an input part for inputting information is accommodated in a housing thereof, an antenna is arranged at an upper surface inside the housing and emits a radio wave based on input information generated by the input part.

22 Claims, 11 Drawing Sheets

FIG. 3
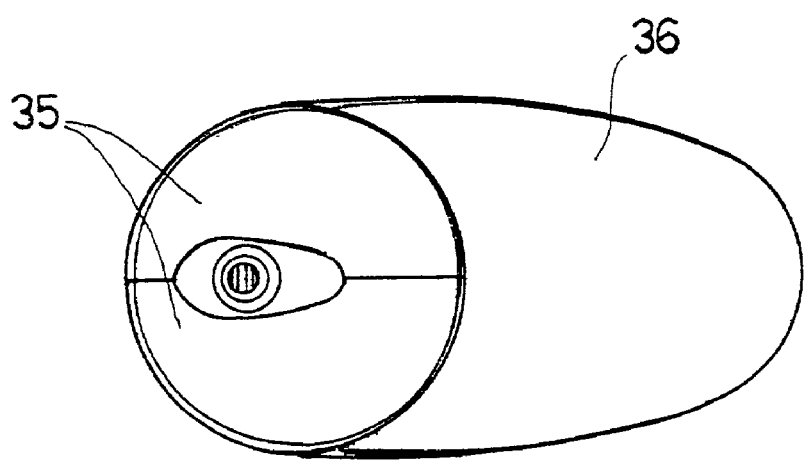
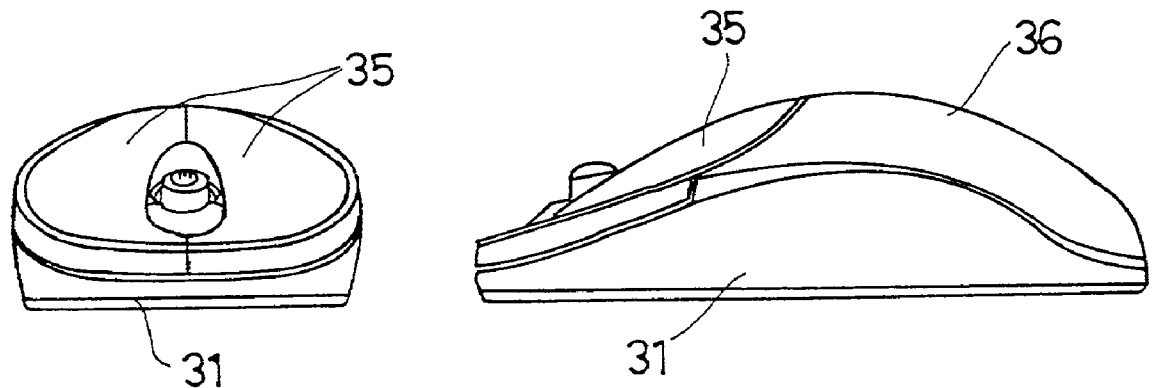
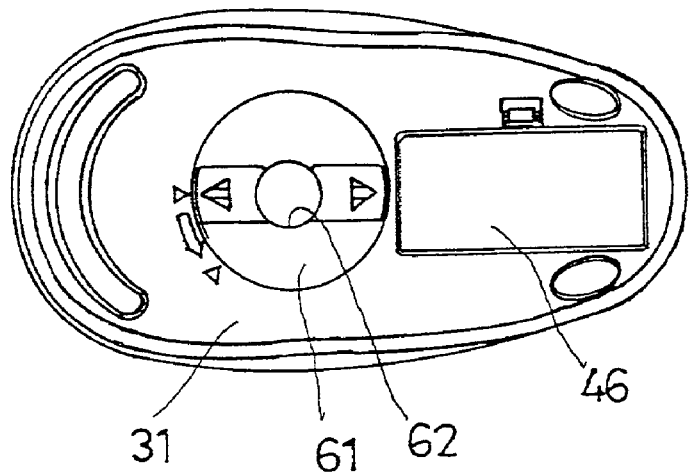

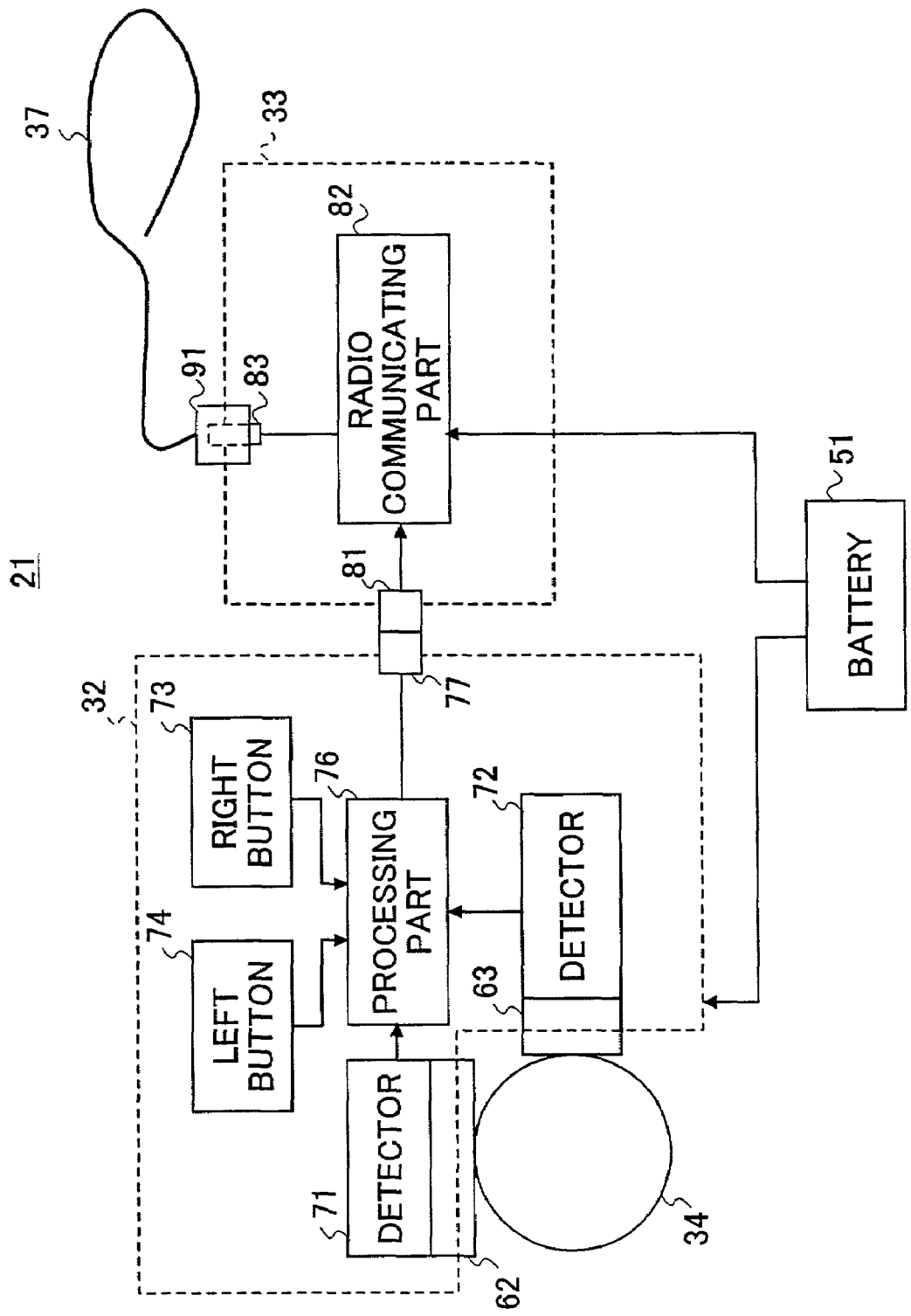

INPUT DEVICE WITH ANTENNA

BACKGROUND OF THE INVENTION

1. Field of the Invention

The present invention generally relates to an input device, and more particularly to the input device for transmitting input information by a radio communication.

2. Description of the Related Art

In the current computer system industry, in order to simplify connections to peripheral devices and to improve operability thereof, a wireless communication has been applied to the peripheral devices such as a mouse and a like.

As a wireless communication method, a radio wave method and an infrared ray method have developed. The radio wave method is applied to a coordinate input device such as the mouse because of a wider flexible range of an input position thereof.

In the coordinate input device applying the wireless method, if there is a conductive object around the coordinate input device, an electrostatic capacity (load capacity), which is occurred between the object and the mouse, is applied to an antenna of the mouse. Then, a transmission rate becomes lower. If a radio field intensity of the mouse is set to be stronger and exceeds a predetermined level so that the transmission rate will not be lower, it is required to get a permission in accordance with the radio wave law. Accordingly, in general, the radio field intensity is set to be at a maximum while not requiring the permission in accordance with the Wireless Telegraph Law.

In a conventional input device applying a radio communication, the antenna is formed on a circuit board arranged on a bottom surface of a housing of the mouse. Therefore, for example, when the mouse is operated on a desk made from steel material, an antenna effect is degraded. And an area, in which the radio field intensity output from the input device is degraded, locally occurs.

SUMMARY OF THE INVENTION

It is a general object of the present invention to provide an input device in which the above-mentioned problems are eliminated.

A more specific object of the present invention is to provide the input device in which can effectively transmit a radio wave.

The above objects of the present invention are achieved by an input device in that an input part for inputting information is accommodated in a housing thereof, the input device including an antenna arranged at an upper surface inside the housing and emitting a radio wave based on input information generated by the input part.

According to the present invention, since the antenna is formed at the upper surface inside the housing, the load capacity to the antenna can be reduced and the radiation effect of the radio wave from the antenna can be improved. Therefore, for example, the radio field intensity can be reduced, or a communicable area can be expanded.

BRIEF DESCRIPTION OF THE DRAWINGS

Other objects, features and advantages of the present invention will become more apparent from the following detailed description when read in conjunction with the accompanying drawings, in which:

FIG. 3 is an outside view of a configuration of the main input device according to the embodiment of the present invention;

FIG. 5 is a block diagram showing a configuration of the main input device according to the present invention;

DESCRIPTION OF THE PREFERRED EMBODIMENTS

Figure 1:
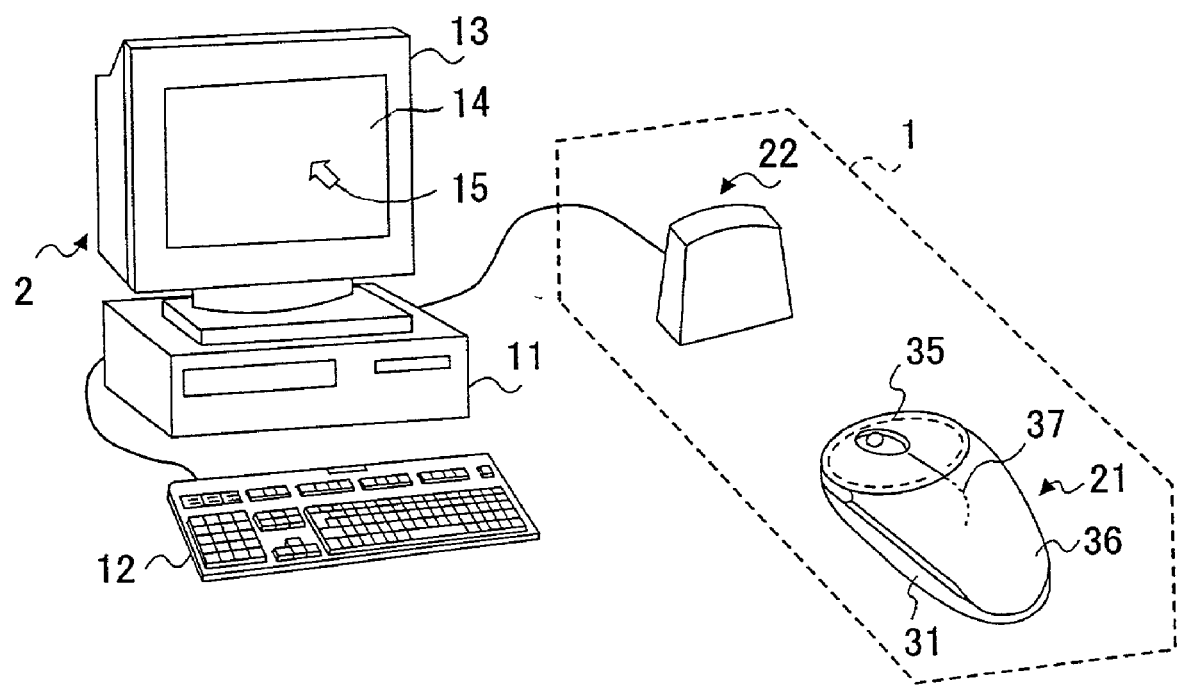
FIG. 1 is a diagram showing a system configuration according to an embodiment of the invention.

FIG. 1 is a diagram showing a system configuration according to an embodiment of the invention.

In the embodiment, a mouse device as an input device will be exampled and will now be described. In the embodiment, the input device 1 is used for a coordinate input of a personal computer 2, for example. The personal computer 2 includes a main system 11 of personal computer, a keyboard 12, and a monitor 13. The keyboard 12 is connected to a PS/2 port or a USB (Universal Serial Bus) port of the main system 11. The keyboard 12 is used to input data or a command to the main system 11. The monitor 13 includes a CRT (Cathode-Ray Tube) display or an LCD (Liquid-Crystal Display) and displays an image corresponding to image data supplied from the main system 11 at a screen 14 of the monitor 13.

The input device 1 includes a main input device 21 and a receiving unit 22. The main input device 21 generates input coordinate data in accordance with an operation of a user and transmits by a radio wave. The receiving unit 22 is connected to the main system 11 by a USB interface or a like. The receiving unit 22 receives a coordinate input data transmitted from the main input device 21 by the radio wave and supplies the coordinate input data to the main system 11 via the USB interface. In the main system 11, for example, a display location of a pointer 15 on the screen 14 is controlled based on the coordinate input data supplied from the receiving unit 22.

Figure 2:
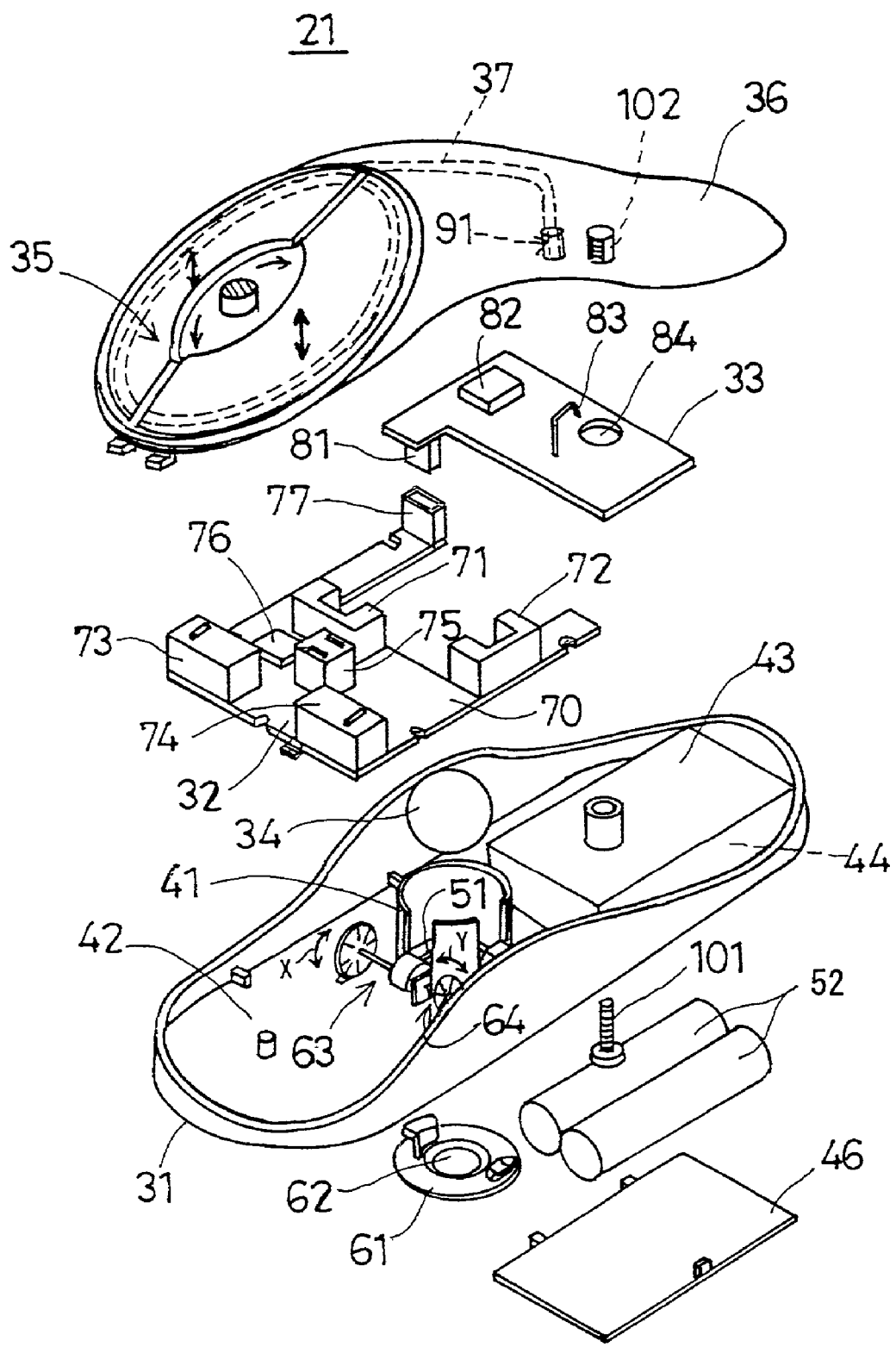
FIG. 2 is an exploded perspective view of a main input device according to the embodiment of the present invention.
Figure 4:
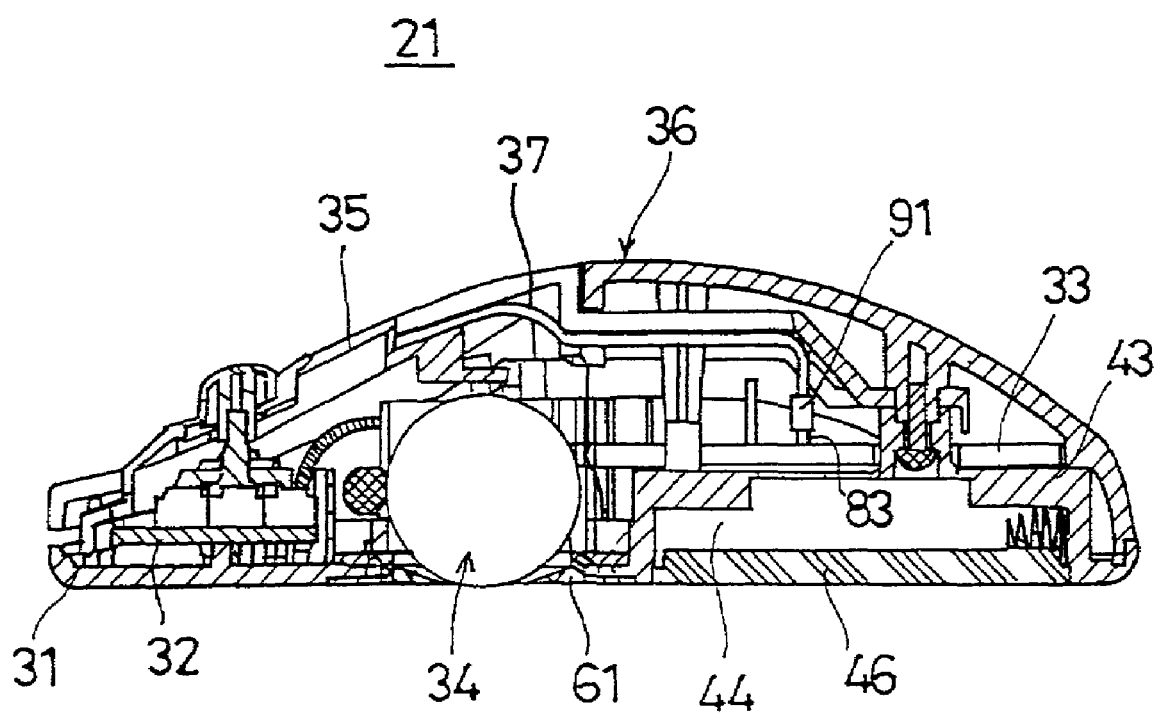
FIG. 4 is a sectional view of the main input device according to the present invention.

FIG. 2 is an exploded perspective view of the main input device according to the embodiment of the present invention. FIG. 3 is an outside view of a configuration of the main input device according to the embodiment of the present invention. FIG. 4 is a sectional view of the main input device according to the present invention. FIG. 5 is a block diagram showing a configuration of the main input device according to the present invention.

Referring to FIG. 2, the main input device 21 includes a case 31, a coordinate detecting circuit board 32, a radio transmitting circuit board 33, a ball 34, a keytop 35, an upper cover 36, and an antenna 37.

On a bottom surface of the case 31, a ball supporting part 41, a circuit board supporting parts 42 and 43, and a battery compartment 44. By the ball supporting part 41, the ball 34 is rotatably supported. An opening part 51 is formed on a bottom of the ball supporting part 41. A supporting part 61 being circular is engaged to the opening part 51. The supporting part 61 covers the opening part 51. a ball aperture 62 is formed on the supporting part 61 and the ball 34 is slightly exposed outside the ball aperture 62. The ball 34 is exposed from the ball aperture 62 and contacts with a desk or a like and then can be rotated.

The battery compartment 44 holds a battery 52. The battery 52 supplies driving power source to the coordinate detecting circuit board 32 and the radio transmitting circuit board 33. The bottom surface of the case 31 where the battery compartment 44 is provided is opened so that the battery 52 is exchangeable. A battery cover 46 is provided to an opened surface of the battery compartment 44.

Rotation detecting parts 63 and 64 are provided around the ball supporting part 41. The rotation detecting part 63 detects a rotation of the ball 34 in an X direction. The rotation detecting part 64 detects a rotation of the ball 34 in a Y direction.

The rotation detecting parts 63 and 64 engage to the coordinate detecting circuit board 32. The coordinate detecting circuit board 32 is supported by the circuit board supporting part 42, and detects rotations of the rotation detecting part 63 and 64, and obtains coordinate information. Rotation detectors 71 and 72, switches 73 through 75, a signal processing part 76, and a connector 77 are mounted on the coordinate detecting circuit board 32.

The rotation detector 71 includes a photoelectric switch (not shown) and generates a pulse signal based on a rotation amount of the rotation detecting part 63. One rotary encoder (not shown) is configured by the rotation detecting part 63 and the rotation detector 71. The rotation detector 72 is configured by the photoelectric switch and generates a pulse signal based on a rotation amount of the rotation detector 64. Another rotary encoder (not shown) is configured by the rotation detecting part 64 and the rotation detector 72.

One pulse signal detected by the rotation detector 71 and another pulse signal detected by the rotation detector 72 are supplied to the signal processing part 76. The signal processing part 76 generates the coordinate information based on the pulse signals supplied from the rotation detectors 71 and 72.

Switching signals corresponding to the switches 73 through 75 are supplied to the signal processing part 76. The signal processing part 76 generates switch information corresponding to the switching signals from the switches 73 through 75.

A connector 81 mounted on the radio transmitting circuit board 33 is connected to the connector 77. The coordinate information and the switch information generated by the signal processing part 76 is supplied to the radio transmitting circuit board 33 through the connectors 77 and 81.

The radio transmitting circuit board 33 includes a radio transmitting part 82. The radio transmitting part 82 receives and sends the coordinate information and button operation information from the coordinate detecting circuit board 32 in accordance with an ASK (Amplitude Shift Keying) method, an FSK (Frequency Shift Keying) method, a PSK (Phase Shift Keying) method, or an SS (Spread Spectrum Communication) method. A signal modulated by the radio transmitting part 82 is supplied to a connection pin 83. The connection pin 83 is provided on the radio transmitting circuit board 33 and is engaged with a connector 91 of the antenna 37. The connector 91 is fixed to an end of the antenna 37.

The connector 91 is connected to the connection pin 83 when the upper cover 36 is attached to the case 31. That is, by attaching the upper cover 36 with a predetermined position of the case 31, the connector 91 is eventually engaged with the connection pin 83 and the connector 91 is connected to the connection pin 83.

Figure 6A:
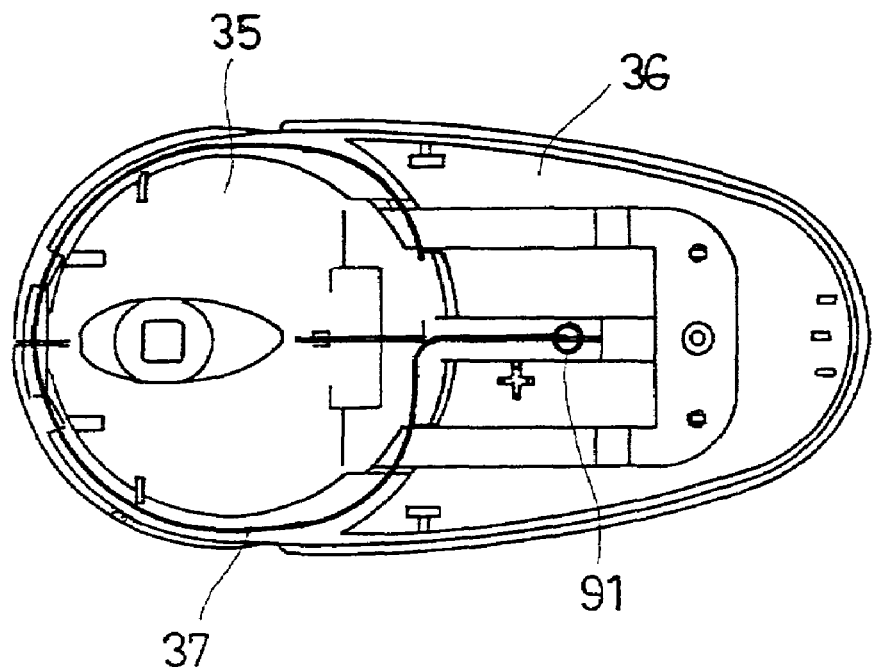
FIG. 6A is a bottom plan view of the cover and FIG. 6B is a sectional side elevation view of the cover.
Figure 6B:
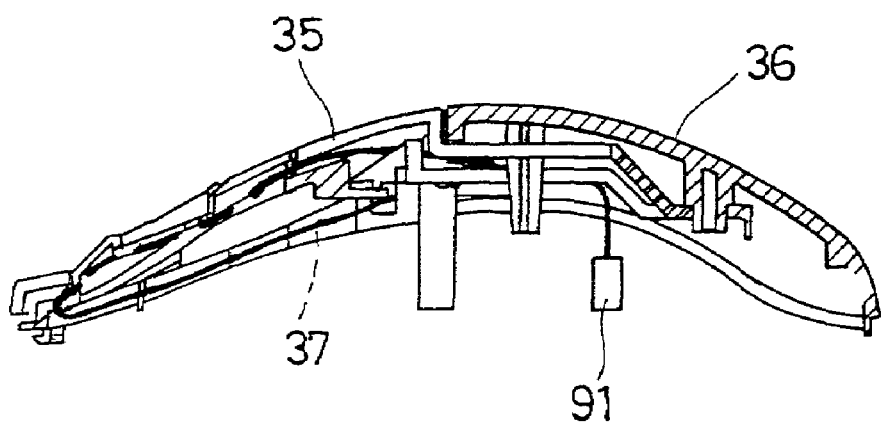

FIG. 6A and FIG. 6B are diagrams for explaining a state of attaching the antenna according to the present invention. FIG. 6A is a bottom plan view of the upper cover 36. FIG. 6B is a sectional side elevation view of the upper cover 36.

The antenna 37 is made from conductor wire rod and is arranged so as to surround the keytop 35 inside the upper cover 36. Another end of the antenna 37 is opened.

In the embodiment, the antenna 37 is arranged on an upper part of the main input device 21 as a coordinate input device. That is, the antenna 37 is provided at a position being further most from a desk. Since the load capacity between the antenna 37 and the desk is decreased, the antenna effect can be improved. Especially, even if the main input device 21 is on the steel desk in that the radio wave from the antenna 37 is remarkably affected, it is possible to expand a communicable area by an improvement of the antenna effect.

Figure 7:
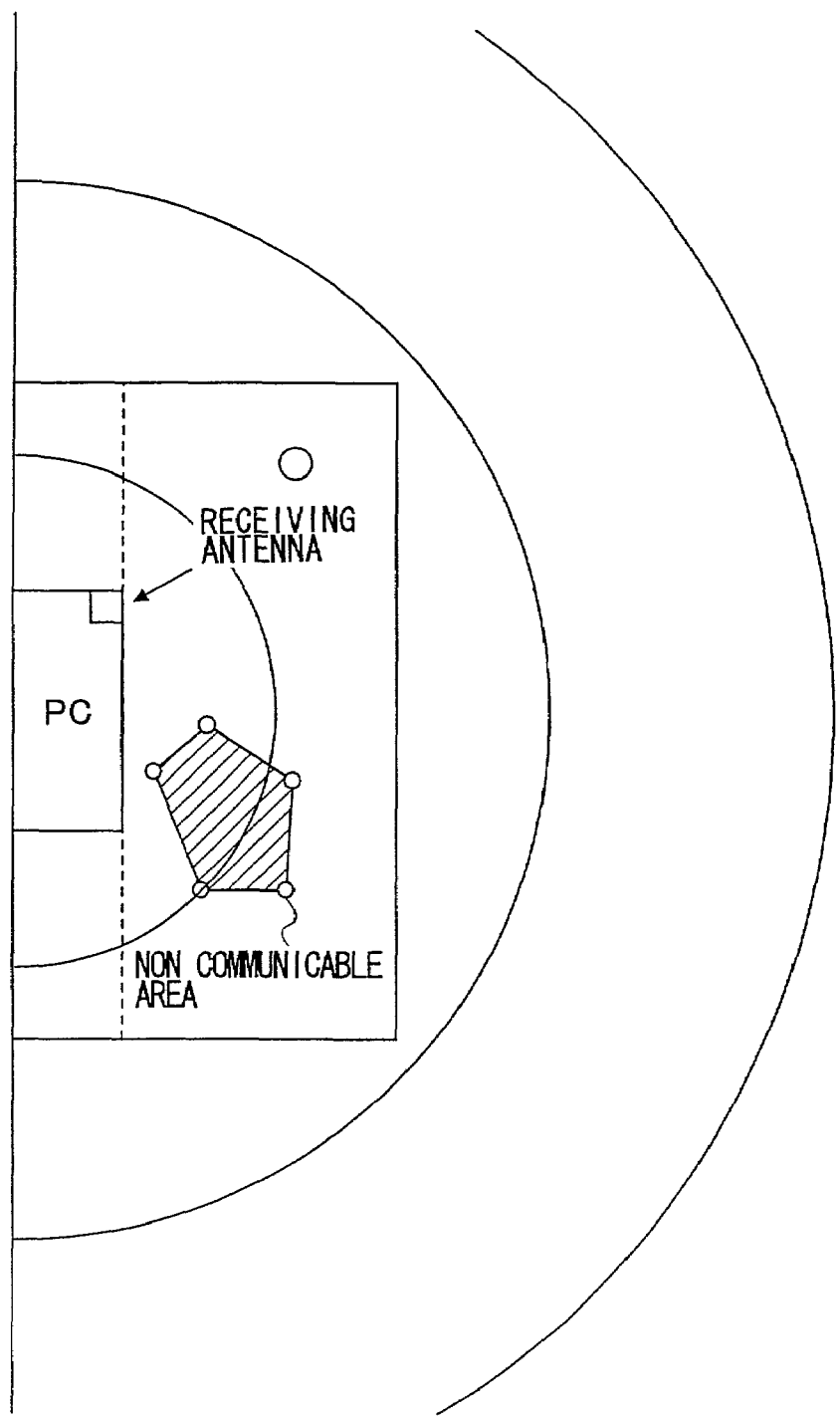
FIG. 7 is a diagram showing a communicable area according to embodiment of the present invention.
Figure 8:
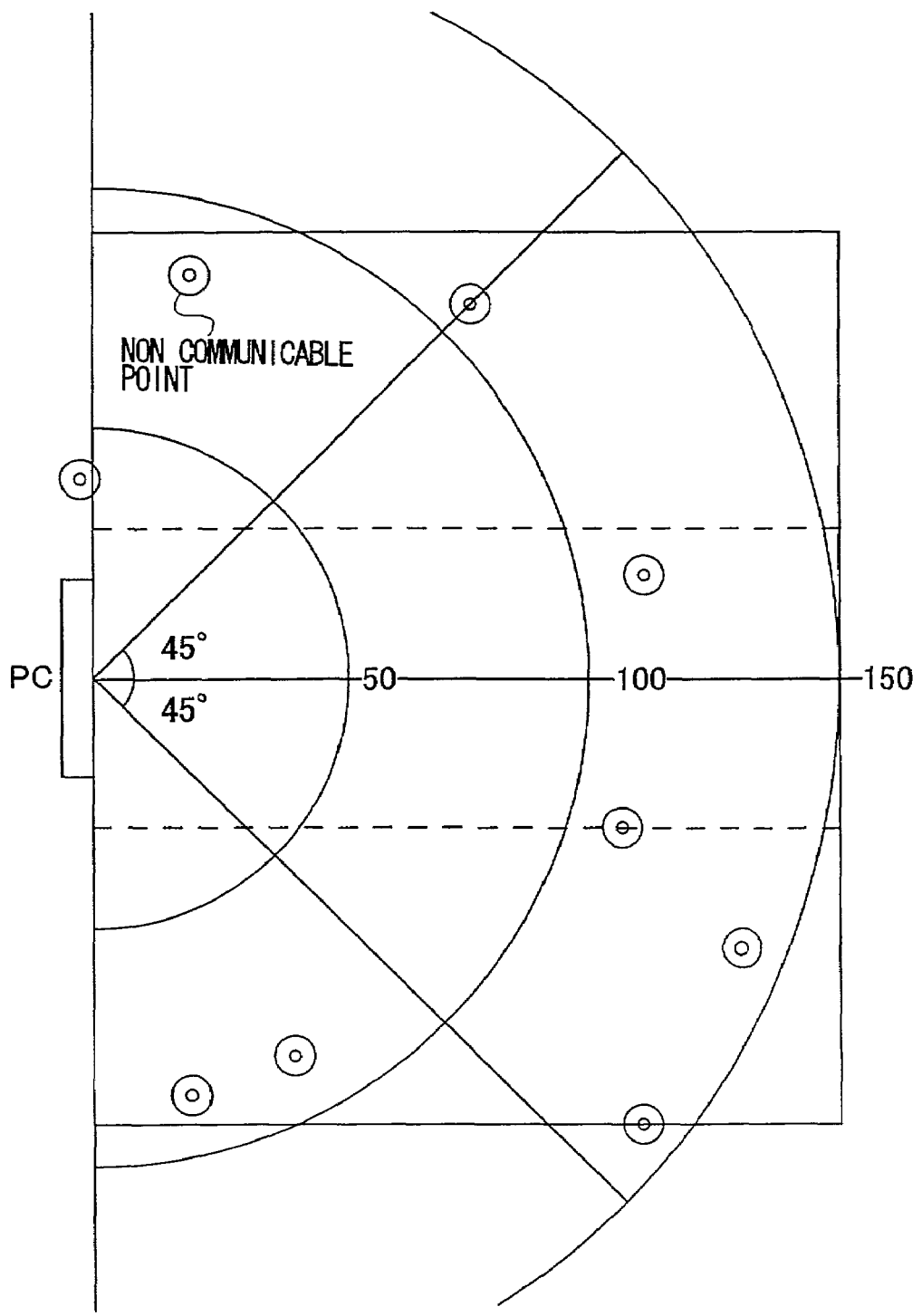
FIG. 8 is a diagram showing a receiving area in a case in which a conventional antenna is arranged on the bottom of a conventional coordinate input device.

FIG. 7 is a diagram showing a communicable area according to embodiment of the present invention. FIG. 8 is a diagram showing a receiving area in a case in which a conventional antenna is arranged on the bottom of a conventional coordinate input device.

As shown in FIG. 7, some non-communicable areas locally exist. However, compared with a case in that the conventional antenna is arranged on the bottom of the conventional coordinate input device shown in FIG. 8, it is possible for the coordinate input device according to the present invention to greatly reduce the number of the non-communicable areas.

In the embodiment, the antenna 37 is made from the conductor wire rod. Alternatively, the antenna 37 may be formed by a printed wiring method on the upper cover 36. Also, in the embodiment, the radio transmitting circuit board 33 is connected to the antenna 37 by engaging the connection pin 83 with the connector 91. Alternatively, the radio transmitting circuit board 33 is connected to the antenna 37 by using a fixing screw 101 and a boss 102.

Figure 9:
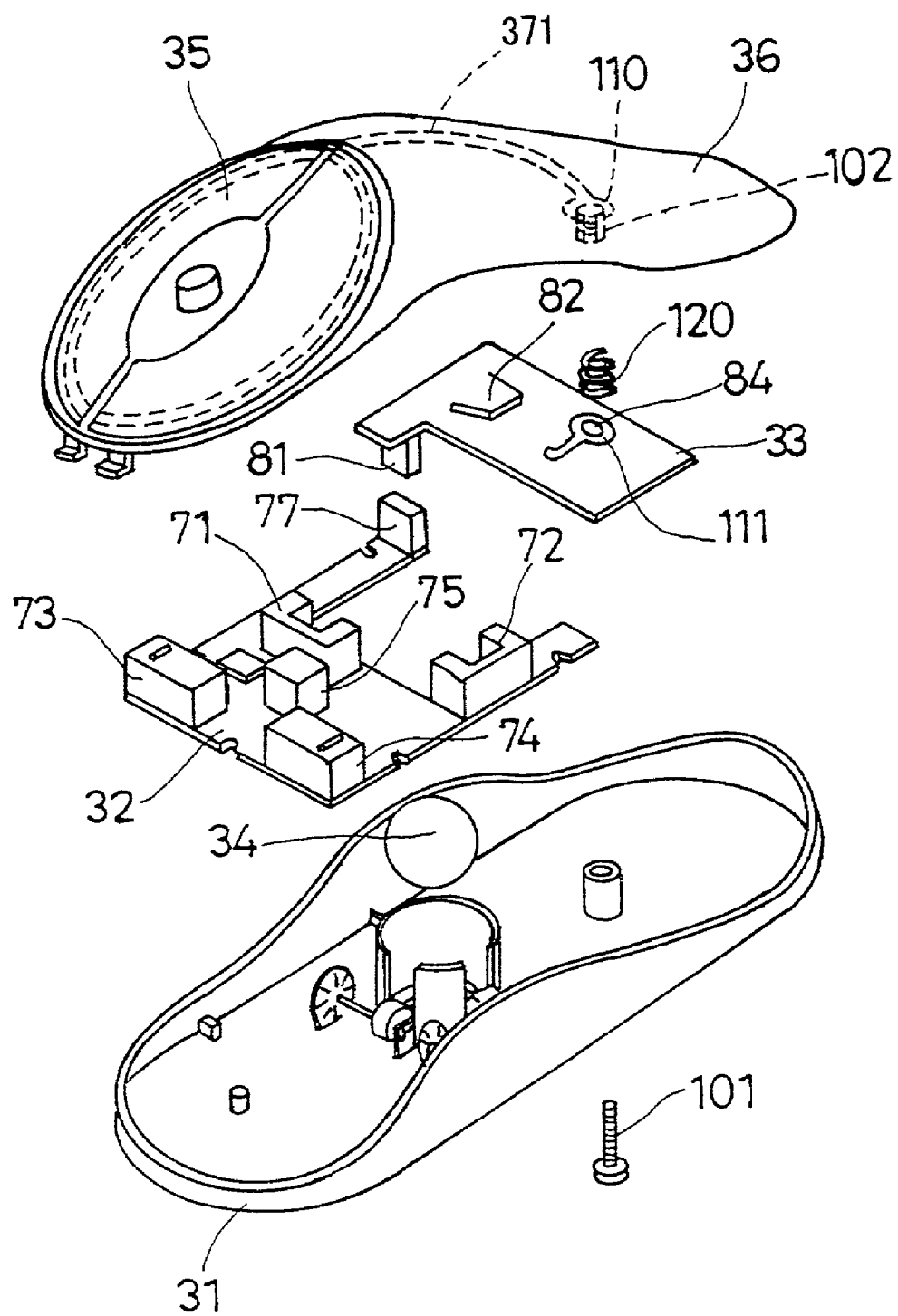
FIG. 9 is a sectional side elevation view of a first variation of the main input device according to the present invention.

FIG. 9 is a sectional side elevation view of a first variation of the main input device 21 according to the present invention.

In a main input device 211 in the first variation, an antenna 371 is formed in which conductive material is formed on the upper cover 36 by a printed wiring method as shown in FIG. 6. One end of the antenna 371 is connected to a connection pattern 110 wired around the boss 102.

On the other hand, a connection pattern 111 is formed by the printed wiring method around a hole 84 where the boss 102 penetrates, on the radio transmitting circuit board 33 is formed. When the upper cover 36 is attached to the case 31, a spring 120 which is conductive is engaged with the boss 102 and the fixing screw 101 is screwed into the boss 102.

The fixing screw 101 is screwed into the boss 102 and then the spring 120 is compressed. In this case, one end of the spring 120 is connected to the connection pattern 110 formed around the boss 102 and another end of the spring 120 is connected a connection pattern 111 formed around the hole 84 of the radio transmitting circuit board 33. Therefore, the radio transmitting circuit board 33 is connected the antenna 37 through the spring 120.

A connecting method for connecting the antenna 37 to the radio transmitting circuit board 33 is not limited a method described above. Alternatively, in a state in which the antenna 37 is connected to the radio transmitting circuit board 33 beforehand, when the antenna 37 is fixed to a side of the upper cover 36 and the upper cover 36 is attached to the case 31, the connector 77 of the coordinate detecting circuit board 32 is connected to the connector 81 of the radio transmitting circuit board 33 so that the antenna 37 is connected to the radio transmitting circuit board 33.

That is, the configuration of the main input device 211 is just to easily connect a circuit at a side of the case 31 to a circuit at a side of the upper cover 36 when the case 31 is attached to the upper cover 36.

Moreover, in the embodiment, the antenna 37 and antenna 371 are arranged so as to surround the keytop 35. Alternatively, the antenna 37 and antenna 371 may be arranged so as to surround a center part of the upper cover 36.

Figure 10:
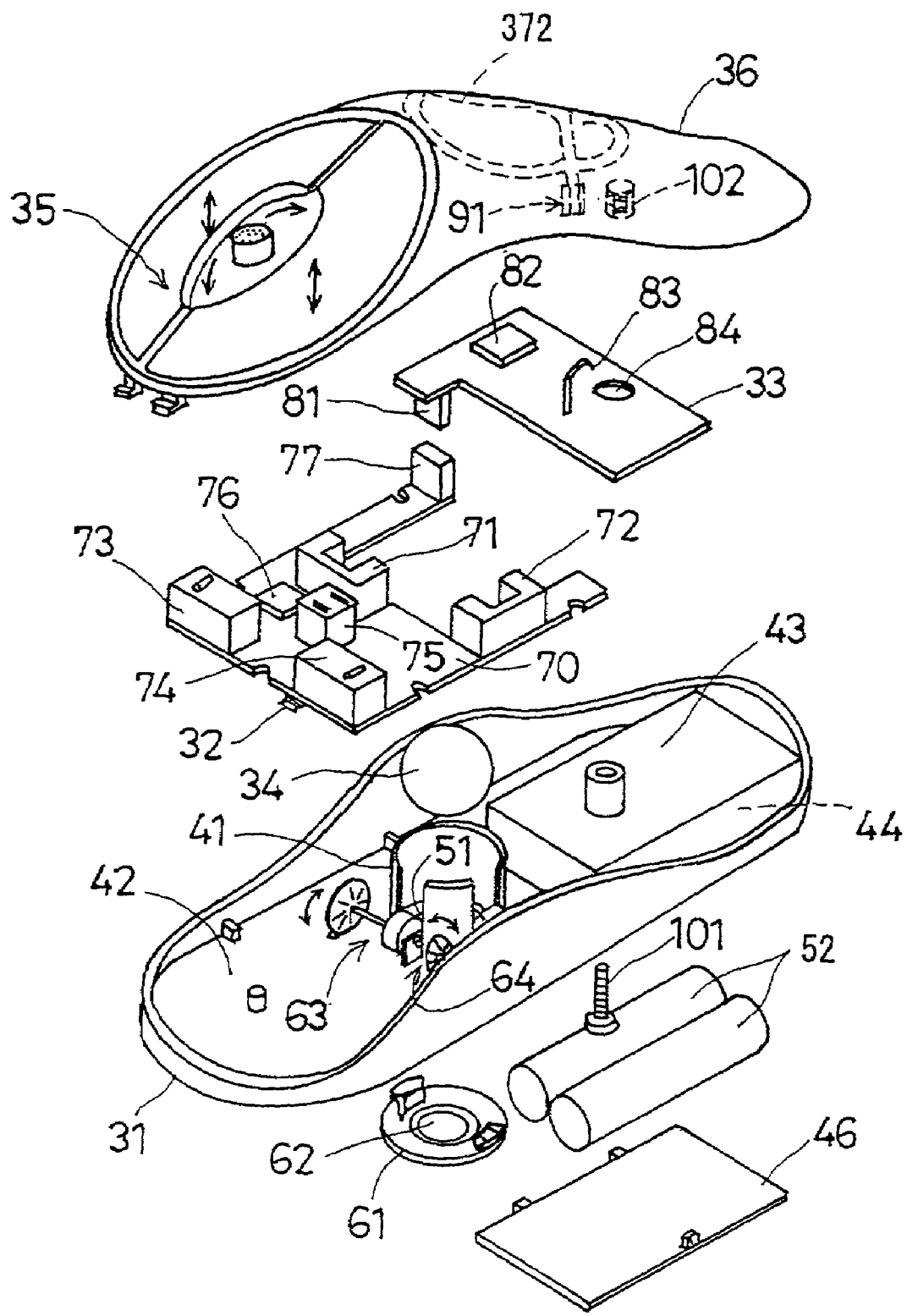
FIG. 10 is a perspective view of another variation of the main input device according to the present invention.
Figure 11A:
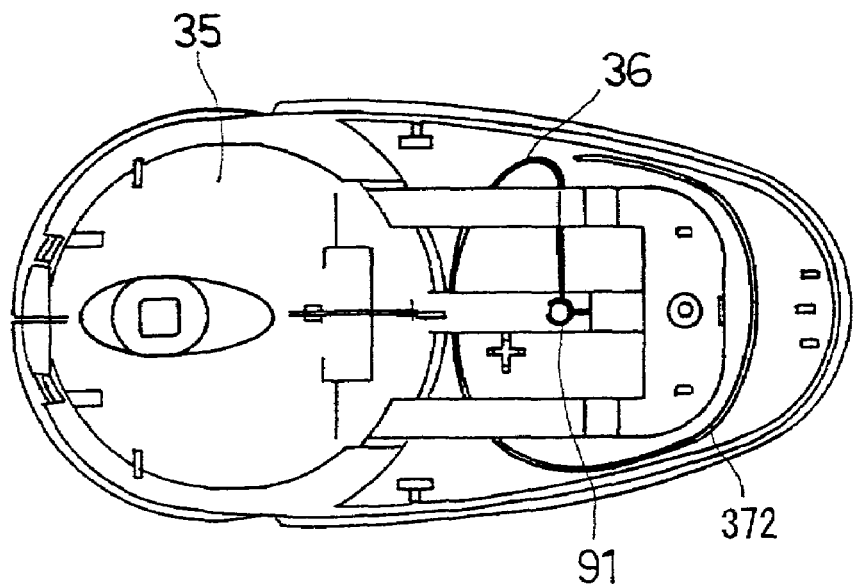
FIG. 11 is a diagram showing a configuration or an upper cover in another variation according to the embodiment of the present invention.
Figure 11B:
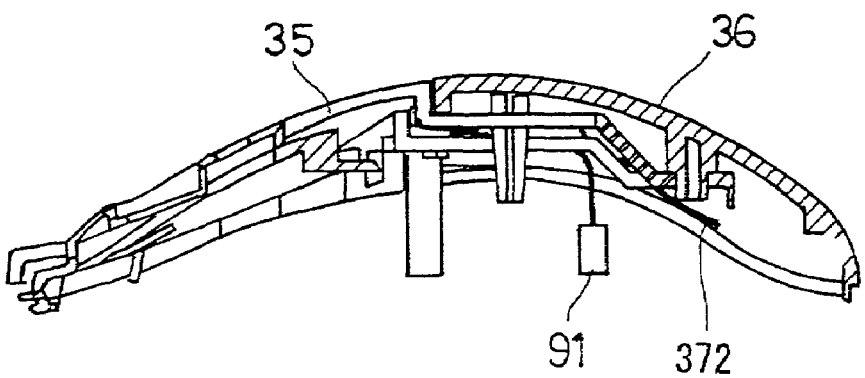

FIG. 10 is a perspective view of a second variation of the main input device 21 according to the present invention. FIG. 11 is a diagram showing a configuration or an upper cover in the second variation according to the embodiment of the present invention.

In an input device 212 in the second variation, the antenna 372 surrounds an approximate center part of the upper cover 36. According to the second variation, since the antenna 372 is arranged at a location far from the bottom surface of the case 31, it is possible to reduce the load capacity between the antenna 372 and the steel desk and then it is possible to improve the transmission effect of the radio wave.

In the embodiment, a contact-type coordinate detecting part is applied to detect a coordinate by detecting the rotation of the ball 34. Alternatively, a non-contact type coordinate detecting part can be applied to detect the coordinate by a reflection of infrared ray.

In the embodiment, the mouse device as a coordinate input device is examined. Alternatively, another coordinate input device such as a track ball can be applied.

According to the present invention, by forming the antenna 37, 371, or 372 at a top surface inside a housing of the coordinate input device, it is possible to reduce the load capacity between the antenna 37, 371, or 372 and the desk and also it is possible to improve a radiation effect of the radio wave from the antenna 37, 371, or 372. Therefore, it is possible to reduce radio field intensity and it is possible to expand the communicable area.

The present invention is not limited to the specifically disclosed embodiments, variations and modifications, and other variations and modifications may be made without departing from the scope of the present invention.

The present application is based on Japanese Priority Application No.2001-151554 filed on May 21, 2001, the entire contents of which are hereby incorporated by reference.

What is claimed is:

1. An input device, wherein a plurality of input parts for inputting information are accommodated in a housing thereof, said input device comprising:
   an antenna arranged at an upper surface inside said housing and emitting a radio wave based on input information generated by at least one of said input parts,
   wherein said housing comprises:
      a case including a first of the plurality of the input parts, and
      a first detachable upper cover that is swappable with a second detachable upper cover,
   wherein said antenna is arranged inside each of said detachable upper covers at an uppermost portion of the housing, and a second of the plurality of said input parts is arranged on each of said detachable upper covers and detachable with the detachable upper cover from the first of the plurality of the input parts,
   wherein the input device further comprises:
      a communicating part provided to said case and supplying a transmission signal to said antenna,
   wherein said antenna is detachably connected to said communicating part by a connector and detachable from the case along with each of the detached upper covers, and
   wherein the input device is a mouse-type input device and data is input to the first of the plurality of the input parts by an interaction of the first of the plurality of the input parts and a fixed surface.

2. The input device as claimed in claim 1, wherein said antenna is made from a conductive wire rod.

3. The input device as claimed in claim 1, wherein said antenna is formed by printing a conductor on the upper surface inside said housing.

4. The input device as claimed in claim 1, wherein said input part is detachably connected to said communicating part by a connector.

5. The input device as claimed in claim 1, wherein said communicating part transmits information from said input part in accordance with an Amplitude Shift Keying method.

6. The input device as claimed in claim 1, wherein said communicating part transmits information from said input part in accordance with a Frequency Shift Keying method.

7. The input device as claimed in claim 1, wherein said communicating part transmits information from said input part in accordance with a Phase Shift Keying method.

8. The input device as claimed in claim 1, wherein said communicating part transmits information from said input part in accordance with a Spread Spectrum Communication method.

9. The input device according to claim 1, wherein the case is attachable to the first detachable upper cover with a screw.

10. The input device according to claim 1, wherein the antenna is arranged so as to surround a center portion of the first detachable upper cover.

11. The input device according to claim 1, wherein the antenna is arranged so as to surround a depressible keytop in the second detachable upper cover.

12. A wireless input device to be manipulated by a user via first input part and a second input part, the input device comprising:
   a case;
   a first detachable upper cover that is connectable to the case to form an inside volume that is swappable with a second detachable upper cover, and
   an antenna, which is located at an uppermost portion of the inside volume, to wirelessly transmit a radio wave that comprises coordinate data to a receiving unit that is connected to a processing unit and detachable from the case along with each of the detached upper covers,
   wherein said first input part is arranged on the first detachable upper cover and detachable with the first detachable upper cover from the second input part, and
   wherein the input device is a mouse-type input device and data is input to the second input part by an interaction of the second input part and a fixed surface.

13. The wireless input device of claim 12, further comprising:
   a radio transmitting circuit board that is contained within the inside volume,
   wherein the antenna is a conductive wire rod that is connected to the radio transmitting circuit board at only one end of the conductive wire rod.

14. The wireless input device of claim 12, wherein the antenna is formed by a printed wiring method on an underside of the first detachable upper cover.

15. The wireless input device according to claim 12, wherein the case is attachable to the first detachable upper cover with a screw.

16. The wireless input device according to claim 12, wherein the antenna is arranged so as to surround a center portion of the first detachable upper cover.

17. The wireless input device according to claim 12, wherein the antenna is arranged so as to surround a depressible keytop in the second detachable upper cover.

18. A wireless input device to be manipulated by a user via a first input part, comprising:
 a case including a second input part; and
 a first detachable upper cover connectable to the case with a fastener to form an inside volume and swappable with a second detachable upper cover,
 wherein the first detachable upper cover includes an antenna to wirelessly transmit data and includes said first input part, the antenna arranged within an inner volume of the first detachable upper cover or formed on a surface of the first detachable upper cover,
 wherein the first input part is detachable with the first detachable upper cover from the second input part, and
 wherein the input device is a mouse-type input device and data is input to the second input part by an interaction of the second input part and a fixed surface.

19. The wireless input device according to claim 18, wherein the first detachable upper cover having an antenna arranged so as to surround a center portion of the first detachable upper cover is swappable with the second detachable upper cover having an antenna arranged so as to surround a depressible keytop in the second detachable upper cover.

20. The wireless input device according to claim 18, wherein the fastener is a screw.

21. A cover for a wireless mouse-type input device to be manipulated by a user, comprising:
 a first input part; and
 an antenna in a first arrangement arranged within an inner volume of the cover or formed on a surface of the cover to transmit data received from the first input part and a second input part that is not installed in the cover,
 wherein the cover is swappable with another cover having an antenna in a second arrangement and the first input part is detachable with the cover from the second input part, and
 wherein data is input to the second input part by an interaction of the second input part and a fixed surface.

22. The input device according to claim 1, wherein the first of the plurality of input parts is a ball.

\* \* \* \* \*

UNITED STATES PATENT AND TRADEMARK OFFICE
CERTIFICATE OF CORRECTION

PATENT NO. : 7,411,580 B2
APPLICATION NO. : 10/016118
DATED : August 12, 2008
INVENTOR(S) : Masahiro Yanagi It is certified that error appears in the above-identified patent and that said Letters Patent is hereby corrected as shown below:

Column 6, Line 39, after "via" insert --a--.

Signed and Sealed this

Second Day of December, 2008

JON W. DUDAS
*Director of the United States Patent and Trademark Office*